United States Patent [19]
Davis et al.

[11] Patent Number: 4,755,935
[45] Date of Patent: Jul. 5, 1988

[54] PREFETCH MEMORY SYSTEM HAVING NEXT-INSTRUCTION BUFFER WHICH STORES TARGET TRACKS OF JUMPS PRIOR TO CPU ACCESS OF INSTRUCTION

[75] Inventors: Alan L. Davis, Half Moon Bay; William Coates, Mountain View, both of Calif.

[73] Assignee: Schlumberger Technology Corporation, Palo Alto, Calif.

[21] Appl. No.: 822,893

[22] Filed: Jan. 27, 1986

[51] Int. Cl.⁴ ............................................. G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,245,052 | 4/1966 | Lewin | 365/49 |
| 3,701,980 | 10/1972 | Mundy | 365/188 |
| 3,906,455 | 9/1975 | Houston et al. | 364/200 |
| 3,940,741 | 2/1976 | Horikoshi et al. | 364/200 |
| 4,200,927 | 4/1980 | Hughes et al. | 364/200 |
| 4,521,850 | 6/1985 | Wilhite et al. | 364/200 |
| 4,594,659 | 6/1986 | Guenthner et al. | 364/200 |
| 4,626,988 | 12/1986 | George | 364/200 |

FOREIGN PATENT DOCUMENTS 0179245  4/1986  European Pat. Off.

OTHER PUBLICATIONS

James E. Smith et al., "Instruction Cach Replacement Policies and Organizations", *IEEE Transactions on Computers*, vol. C-34, No. 3, pp. 234–241, Mar. 1985.
James R. Goodman, "Using Cache Memory to Reduce Processor-Memory Traffic", *Assn. for Computing Machinery*, pp. 124–131, 1983.
Alan Jay Smith, "Cache Memories", *Computing Surveys*, vol. 14, No. 3, pp. 473–530, Sep. 1982.

*Primary Examiner*—Archie E. Williams, Jr.
*Assistant Examiner*—Michael J. Ure
*Attorney, Agent, or Firm*—Fitch, Even, Tabin & Flannery

[57] ABSTRACT

A memory system (30) for storing and delivering instructions to a central processing unit (14) in a data processing system includes a main memory (32), a buffer memory (35) and a control unit (42). The main memory includes a series of memory slots (34), each memory slot storing one track. Each track consists of a sequential list of instructions which are executed in order unless a jump instruction is encountered. Each track ends with a jump instruction and begins with an instruction which is a target instruction of at least one jump instruction. The control unit copies each track into the buffer memory prior to delivering instructions from that track to the CPU. This buffer has a pointer (40) which specifies the next instruction in the buffer to be examined. If the instruction is a non-jump instruction, it is delivered to the CPU. If the instruction is a jump instruction which is to be executed, the track which begins with the target instruction specified in the jump instruction, if not already in the buffer, is loaded into the buffer.

Special jump instructions facilitate subroutine calls and interrupts by allowing jumps to be executed to target instructions which are not at the beginning of a track. A CPU/memory-system bus (48) includes signal lines under the control of the CPU, one or more of which may be used to control conditional jumps and signal interrupts to the memory system.

18 Claims, 6 Drawing Sheets

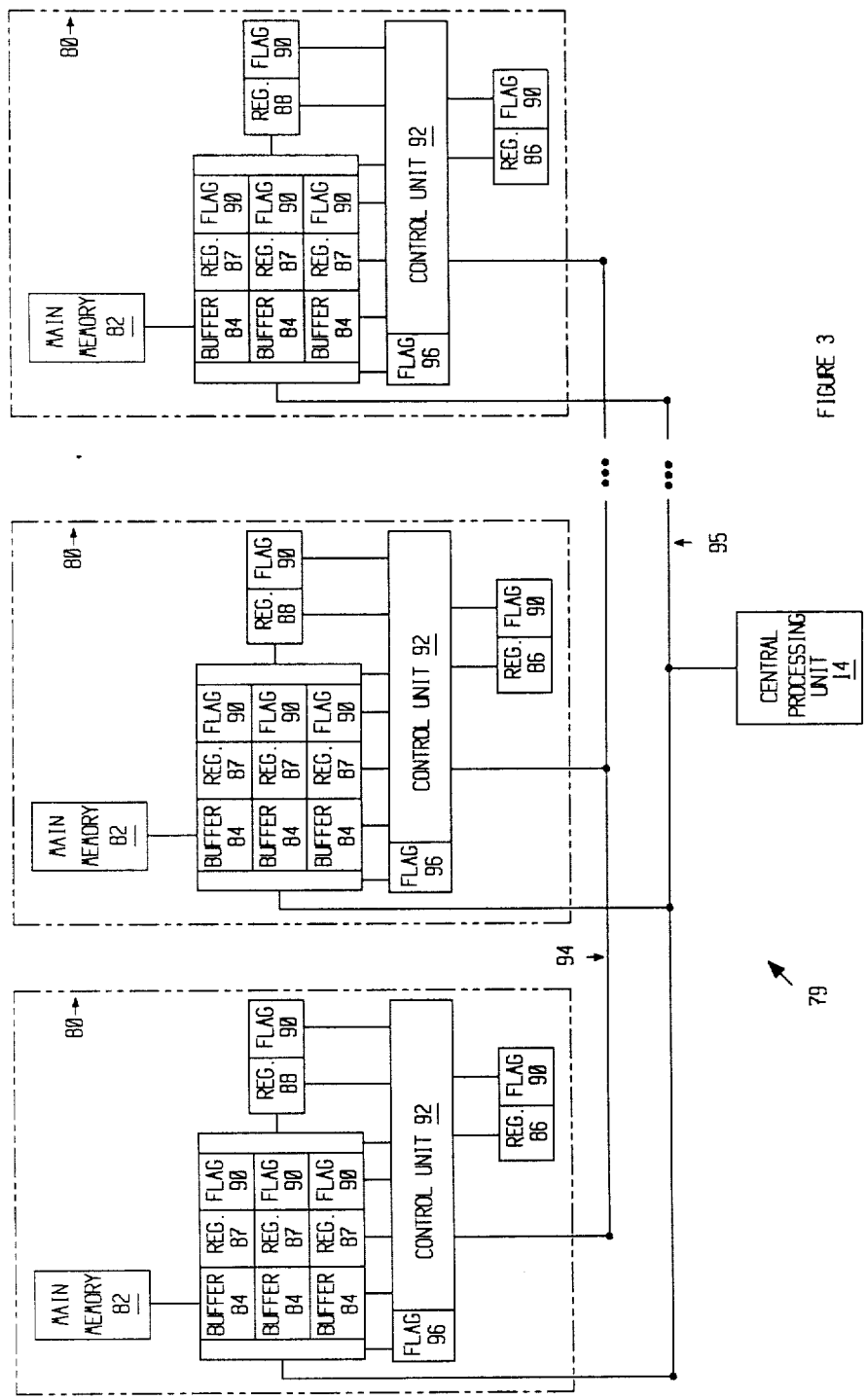

PREFETCH MEMORY SYSTEM HAVING NEXT-INSTRUCTION BUFFER WHICH STORES TARGET TRACKS OF JUMPS PRIOR TO CPU ACCESS OF INSTRUCTION

BACKGROUND OF THE INVENTION

The present invention relates generally to the field of computer memory systems and more particularly to computer memory systems for storing and delivering instructions to a central processing unit.

In spite of the many improvements which have been made in computing systems, modern computers differ little from the classical Von Neumann machines. A Von Neumann machine consists of a central processing unit and a memory. The computing power is concentrated in the central processing unit. The memory merely stores the instructions and data used by the central processing unit. The memory consists of a contiguous block of fixed length data words. Each data word is accessed by specifying the location of the desired data word relative to the first data word in the memory. The location of a desired data word is normally referred to as the address of the data word. The central processing unit accesses the data and instructions stored in the memory by computing the address of the desired data and then communicating that address to the memory unit. This division of labor between the memory and the central processing unit is inefficient for a number of reasons.

First, a considerable fraction of the typical central processing unit's time must be devoted to calculating addresses. While the central processing unit is calculating an address, it is not free to perform other tasks, since the hardware needed for address computations is also needed for most of the other instructions carried out by the central processing unit. In addition, the hardware needed to carry out the address calculations significantly increases the physical size of the central processing unit. This is particularly important in VLSI designs in which the central processing unit is constructed on a single chip. As the size of the chip increases, the speed at which the central processing unit can operate, in general, decreases. This decrease in speed results from the longer connecting paths which are needed to connect the various elements on the chip. These long paths contain parasitic capacitances which must be charged and discharged each time the logic level on the conductor in question is changed. The time to charge and discharge these capacitances limits the speed of the central processing unit. Further, cost of a VLSI circuit is directly related to the physical size of the chip on which it is located. This cost increases rapidly with increasing chip size.

A second source of inefficiency arises from the use of the same memory for storing both instructions and data. The number of bits in each word is the same whether it is used for storing an instruction or a data value. However, the optimum size for a data word will in general be quite different from the optimum size of a storage word for an instruction. As a result, a compromised word length must be used.

The use of the same memory for both data and instructions may also result in a slower data processing system. In general, the time needed to access a specific memory word in a VLSI memory increases with the physical size of the memory. Hence, if the instructions are located in the same large memory as the data on which these instructions operate, the time needed to fetch an instruction will, in general, be longer than it would be if the instructions were stored in a small memory because the longer signal paths needed to access the additional memory cells result in parasitic capacitances. In addition, since both the data and instructions use the same bus, data and instructions may not be concurrently accessed which further reduces processing speed. These problems may be overcome to some degree by the use of small high speed cache memories which act as a buffer between the large slower memory and the central processing unit. In such systems, blocks of data and/or instructions are transferred to the cache memory by a separate processor while the central processing unit is executing other instructions. However, for this strategy to be successful, one must have some way of predicting which blocks of data or instructions will be needed next. This problem has not been adequately solved in prior art systems employing such cache memories.

The processing delays incurred while the central processing unit calculates the address of the next instruction and fetches this instruction may be overcome to some extent by the use of a "pipelined" central processing unit. A typical pipelined central processing unit can process several instructions concurrently. It is divided into stages. The first stage is typically devoted to fetching the next instruction to be processed. This instruction is then sent to the second stage which decodes the instruction. That is, it converts the instruction "opcode" to a series of binary bits which are placed in an internal register. These bits are used to control the various gates in the third stage which is responsible for the execution of the instruction. A final stage which is responsible for storing results back in the memory is also sometimes included in such pipelined processors.

A four stage pipelined processor of the type described above can work on four instructions concurrently. Each instruction requires four memory cycles to complete. On each memory cycle, a new instruction is inputted to the processor and one of the old instruction previously entered into the processor will have been completed. Hence, the pipelined processor effectively executes one instruction per memory cycle even though the time to complete a single instruction is four memory cycles. This is the result of concurrently performing calculations on four instructions at a time. In the first memory cycle, the next instruction is fetched into the first stage. The instruction which entered the processor on the previous memory cycle will have been passed on to the second stage where it will be decoded during this memory cycle. The instruction which entered the processor two memory cycles earlier will now have been passed on to the execution stage where it will be executed during this memory cycle. Finally, the instruction which entered the processor three memory cycles earlier will now have entered the final stage in which results are stored back in the memory.

This improvement in throughput is only fully realizable when the processor is executing a program which does not contain a large number of "jump" instructions. As used herein, a jump instruction is any instruction whose execution results in an instruction other than the instruction following said jump instruction being executed next. Pipeline processors are based on the assumption that the next instruction to be executed is stored in the memory at a location immediately after that at which the current instruction was stored. A counter is maintained which specifies the address of the next instruction to enter the pipeline. Each time an instruction enters the pipeline, this counter is incremented. Although the next instruction is usually the one following the last instruction in the memory, there are a large number of cases in which the next instruction is located elsewhere in the memory. These cases occur when a jump instruction is encountered. Jump instructions may either be conditional or unconditional. An unconditional jump instruction specifies the location for the next instruction to be executed which is different from the next sequentially stored instruction in the memory. A conditional jump instruction specifies that the next instruction is to be the next sequentially stored instruction in the memory unless a specified condition is met. If the specified condition is met, the next instruction is to be the one located at the address specified in the jump instruction.

In the case of the four stage pipeline processor described above, a jump instruction will not be executed until it is in the execution stage of the processor. By this time, the two instructions stored in memory after the jump instruction in question will have also entered the pipeline. These are the wrong instructions if the jump specified in the jump instruction is executed, since the next instruction to be executed after the jump instruction is the one specified in the jump instruction, not the one following the jump instruction in the memory. Hence, when the jump instruction is executed, the instructions already in the pipeline must be discarded and the pipeline refilled starting with the instructions at the address specified in the jump instruction. As a result, at least two memory cycles will be lost, i.e., the time needed to load and process the two instructions which replace the two instructions which were discarded after the jump instruction was executed.

Jump instructions also complicate the use of cache memories. Prior art cache memory systems are transparent to the central processing unit. The cache memory is a fast memory which is inserted into the system between the central processing unit and a slower large capacity memory. When the central processing unit requires a data word, it places the address of the data word in question on a bus which is monitored by the cache. If this word is already stored in the cache memory, it is sent from the cache memory to the central processing unit. If the data word in question is not already in the cache, the central processing unit must wait while it is loaded into the cache. The extent to which such a cache memory can be used to increase processor speed depends upon its ability to predict the next block of data words which will be needed by the central processing unit. Unless the cache memory processor, which makes this prediction can recognize jump instructions and determine the address to which the jump will be made, it can not make an accurate prediction. Hence, it will not have loaded the appropriate data words when a jump instruction is executed by the central processing unit. Thus, to be effective, the jump instruction recognition and decoding logic which is present in the central processing unit must be duplicated in the cache processor.

Broadly, it is an object of the present invention to provide a memory system which is optimized for the delivery of instructions to a central processing unit.

It is a further object of the present invention to provide an instruction memory system in which the width of the data words used to store the instructions is matched to the instruction set of the central processing unit to which said memory system is connected.

It is a still further object of the present invention to provide an instruction memory system in which jump instructions are executed in the memory system thereby eliminating the need to provide duplicate hardware in the central processing unit for executing such jump instructions.

It is yet another object of the present invention to provide an instruction memory system which substantially reduces the number of situations in which the pipeline of a pipelined processor must be emptied and refilled in response to a jump instruction.

It is yet another object of the present invention to provide an instruction memory system which relieves the central processing unit of the task of calculating the address of the next instruction to be executed by the central processing unit.

These and other objects of the present invention will become apparent from the following detailed description of the present invention and the accompanying drawings.

SUMMARY OF THE INVENTION

The present invention consists of a memory system for storing and delivering instructions to a central processing unit in a data processing system. The instructions which make up the programs executed by the data processing system are divided into two broad classes, jump instructions and non-jump instructions. Jump instructions specify a second instruction, referred to as the target instruction, which is to be executed next if said jump instruction is executed. According to the present invention, each program to be executed by the central processing unit is stored in the instruction memory as a plurality of tracks. Each track consists of a sequential list of instructions which are executed in the order in which said instructions are stored unless a jump instruction contained in said track is executed. In the latter case, the program execution continues with the first instruction of the track which begins with the target instruction specified in said jump instruction, with an instruction specified in one of a plurality of internal registers, or with another instruction in the current track depending on the jump instruction in question. Each track ends with a jump instruction. Each track begins with an instruction which is a target instruction of at least one jump instruction stored in the instruction memory system according to the present invention. The present invention delivers the non-jump instructions to the central processing unit. Jump instructions are not delivered to the central processing unit. Instead, the present invention executes the jump instructions within the memory system of the present invention.

The memory system of the present invention includes a main memory, a buffer memory and a control unit. The main memory includes a series of memory slots, each such memory slot being used to store one track. The control unit copies each track into the buffer memory prior to delivering instructions from that track to the central processing unit. This buffer has a pointer which specifies the next instruction in the buffer to be examined. If the instruction so indicated is a non-jump instruction, it is delivered to the central processing unit. If the instruction is a jump instruction which is to be executed, the present invention causes the track which begins with the target instruction specified in the jump instruction to be loaded into the buffer, if said track is not already in the buffer. Then it sets the pointer to specify the first instruction in said track.

The present invention communicates with the central processing unit over a bus which includes signal lines under the control of the central processing unit. One or more of these signal lines may be used to control conditional jumps. Conditional jumps are jumps which are to be made only if a condition specified in the program stored in the present invention is satisfied. In addition, these signal lines are used to signal the present invention in the event of an interrupt.

To facilitate programming techniques which employ subroutine calls and interrupts, registers are provided for storing the address of the next instruction to be executed. The present invention supports special jump instructions which result in program execution resuming at the address stored in one of these registers. These special jump instructions allow jumps to be executed to target instructions which are not at the beginning of a track.

In the preferred embodiment, duplicate pointers are used to facilitate switching between foreground and background programs and between one of these programs and system programs. The preferred embodiment also includes circuitry which allows several memory systems according to the present invention to be coupled together to form a larger memory system.

BRIEF DESCRIPTION OF THE DRAWINGS

FIG. 3 a block diagram of a memory system constructed from a plurality of memory chips, each said memory chip being constructed according to the present invention.

DETAILED DESCRIPTION OF THE INVENTION

Figure 1:
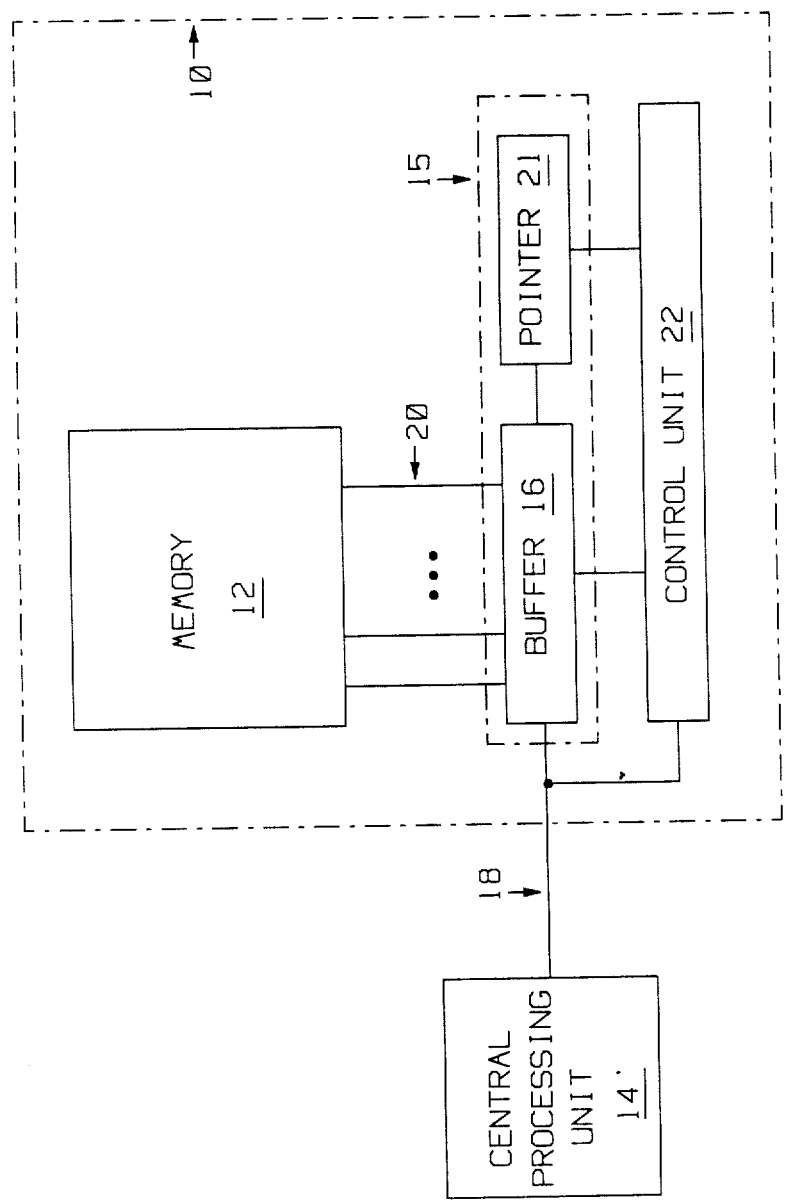
FIG. 1 is a block diagram of an instruction memory system constructed according to the present invention.

The apparatus of the present invention is a memory system which is optimized for storing and delivering instructions to a central processing unit over a dedicated bus connecting the central processing unit to the present invention. In the preferred embodiment, the instructions are delivered asynchronously to the central processing using conventional "hand-shaking" procedures. The central processing unit in question is connected to a second memory in which data used by the program stored in the present invention is stored. This second memory is accessed by the central processing unit over a separate bus. Hence, different word sizes may be used for instructions and data. In the following discussion, the term central processing unit will be used for the combination of a central processing unit and its associated data memory.

In general, a data processing system executes programs which consist of instructions which are to executed sequentially in the order in which they are stored in the memory system. This sequential execution may be interrupted by a jump instruction which causes the central processing unit to execute the instruction stored at a location or address in the memory system which is specified in the jump instruction instead of executing the instruction following the jump instruction. Hereinafter, the instruction stored at the address specified by the jump instruction will be referred to as the target instruction and the address in question will be referred to as the target address.

In conventional computer systems, the central processing unit executes jump instructions. These instructions include unconditional jump instructions, conditional jump instructions, subroutine call and return instructions, and interrupt servicing call and return instructions. In such systems, the central processing unit includes a register which contains the address of the next instruction which is to be executed. After each instruction is executed, this register in incremented such that it contains the address of the next instruction to be executed. When a jump instruction is encountered, the central processing unit changes the contents of this register to the target address. As pointed out above, a pipelined central processing unit executes jump instruction very inefficiently, since it must discard the instructions which are in the "pipeline" after the jump instruction and then refill the pipeline. The present invention avoids this inefficiency by executing jump instructions in the memory instead of in the central processing unit. Hence, except in a few cases which will be described below, the pipeline never contains instructions which must be discarded.

In addition, since the memory system according to the present invention executes all jump instructions, the central processing unit need not contain hardware for executing jump instructions. This simplifies the design of the central processing unit. It also reduces the number of stages which must be included in a pipeline processor, since the central processing unit no longer need compute the address of the next instruction. Since there are fewer stages in the pipeline processor, the time needed to reload the pipeline in the worse case jump situation is reduced.

A block diagram of an instruction memory system according to the present invention is shown at 10 in FIG. 1 in order to illustrate the basic principles employed in the present invention. A main memory 12 is used to store the program being executed by the central processing unit 14'. The program is divided into sequences of instructions referred to as tracks. Each track consists of a series of instructions which are to be executed sequentially in the order in which the instructions are stored in the main memory 12. Each track ends with a jump instruction. This jump instruction provides the means for starting a new track when all the instructions in the current track have been addition, each track begins with an instruction which is a target of some jump instruction in the program. The address of each instruction in a track may be specified by the address of the first instruction of the track, referred to as the track address, and the location of said instruction relative to the first instruction of the track, referred to as the offset. Each track may also contain one or more jump instructions, in addition to the last instruction in the track, with a target instruction which is not part of the track in question. For example, a conditional jump instruction may appear within the body of the track.

Figure 1A:
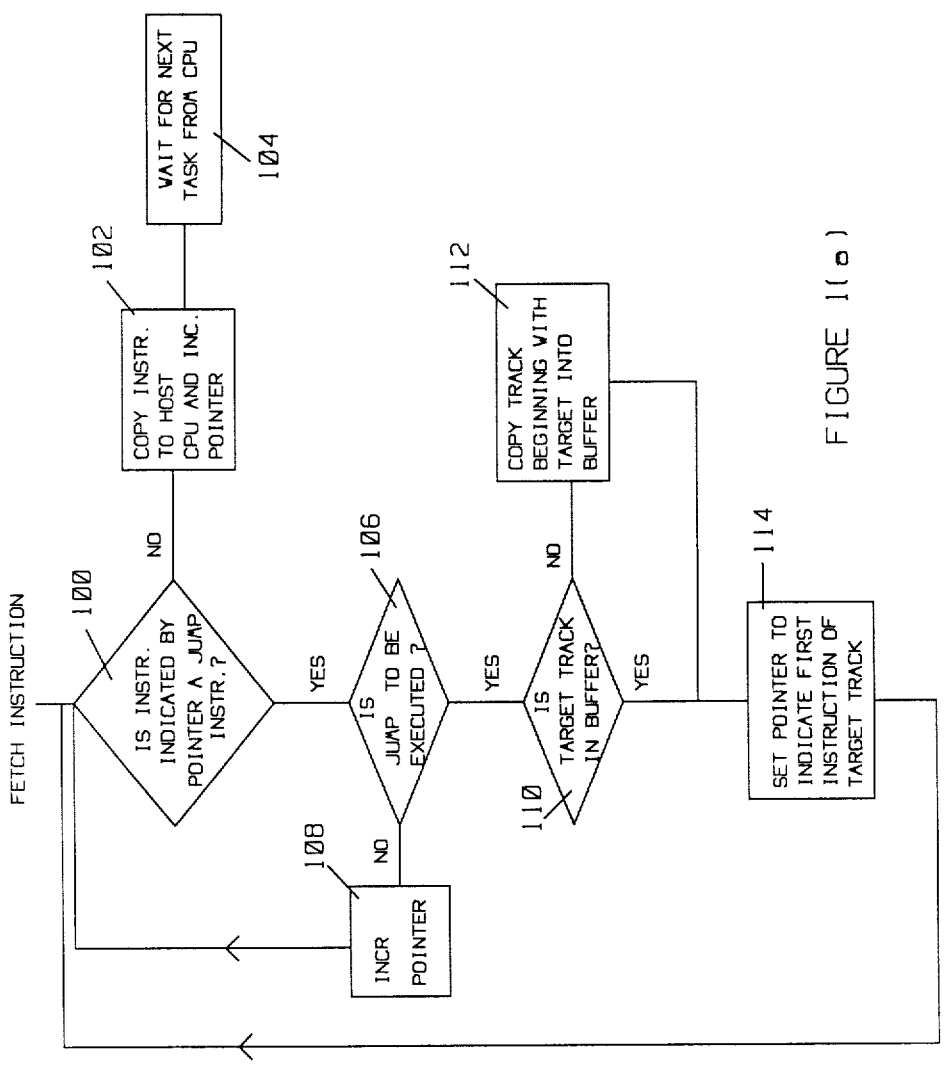
FIG. 1(a) is a flow chart of the basic instruction fetch cycle in an apparatus according to the present invention.

Referring again to FIG. 1, one or more tracks stored in the main memory 12 are transferred to a buffer 15 which includes buffer memory 16 which is used to deliver instructions to the central processing unit 14' over a bus 18. In the preferred embodiment, the entire track is copied into the buffer memory 16 in a single write cycle over a wide bus 20. The buffer 15 also includes a pointer 21 which indicates the next instruction in the buffer memory 16 which is to be executed. Refer now to FIG. 1(a) which is a flow chart of the basic instruction fetch cycle according to the present invention. A control unit 22 examines the instruction indicated by the pointer 21 as shown at 100 in FIG. 1(a). If this is not a jump instruction, it is delivered to the central processing unit 14 over the bus 18 as shown at 102 and 104 in FIG. 1(a). If the instruction is a jump instruction, the control unit 22 determines whether or not a jump is to be executed to the target instruction specified by this jump instruction as shown at 106 in FIG. 1(a). If the jump instruction is not to be executed, i.e., a conditional jump instruction in which the condition specified in said jump instruction is not met, the control unit 22 examines the instruction following said jump instruction as shown at 108 in FIG. 1(a). If the jump is to be executed, the control unit 22 examines the tracks stored in the buffer memory 16 to determine if the track beginning with the target instruction in question is in the buffer memory 16 as shown at 110 in FIG. 1(a). If it is not, unit 22 copies this new track from the main memory 12 to buffer memory 16 as shown at 112 in FIG. 1(a), as described in greater detail below. The control unit 12 then sets the pointer 21 to indicate the first instruction of this new track as shown at 114 in FIG. 1(a). This instruction is then examined by the control unit 22 to determine if it is to be sent to the central processing unit 14'. If the jump instruction is a conditional jump instruction and the condition specified in the instruction has not been met, the control unit 22 increments the pointer 21 such that said pointer points to the next instruction in the current track. It should be noted that there will always be such an instruction, since each track ends with a jump instruction which is not a conditional jump instruction.

A special class of local jump instructions is also implemented. This class consists of conditional and unconditional jump instructions whose target address is in the same track as the jump instruction in question. When such a jump instruction is encountered, the control unit 22 sets the pointer 21 to indicate the target instruction in question. In contrast to the normal jump instructions described above, such local jump instructions are not limited to one per track.

As mentioned above, in addition to delivering instructions to the central processing unit 14' and executing jump instructions, the control unit 22 supervises the transfer of the tracks from the main memory 12 to the buffer memory 16. This is done in a manner which minimizes delays resulting from changing tracks in response to jump instructions. Each time the pointer 21 is reset to indicate the first instruction of a track in the buffer memory 16, the control unit 22 examines the jump instructions contained in said track. For each jump instruction in the track, it determines the target instruction of said jump instruction and then copies the track beginning with said target instruction into the buffer memory 16. These operations are interleaved with the delivery of instructions to the central processing unit 14' so that the execution of instructions by the central processing unit 14' is not delayed by this copying operation. Hence, the track needed to continue the program after a jump instruction is encountered will, in general, already be in the buffer memory 16.

Figure 2:
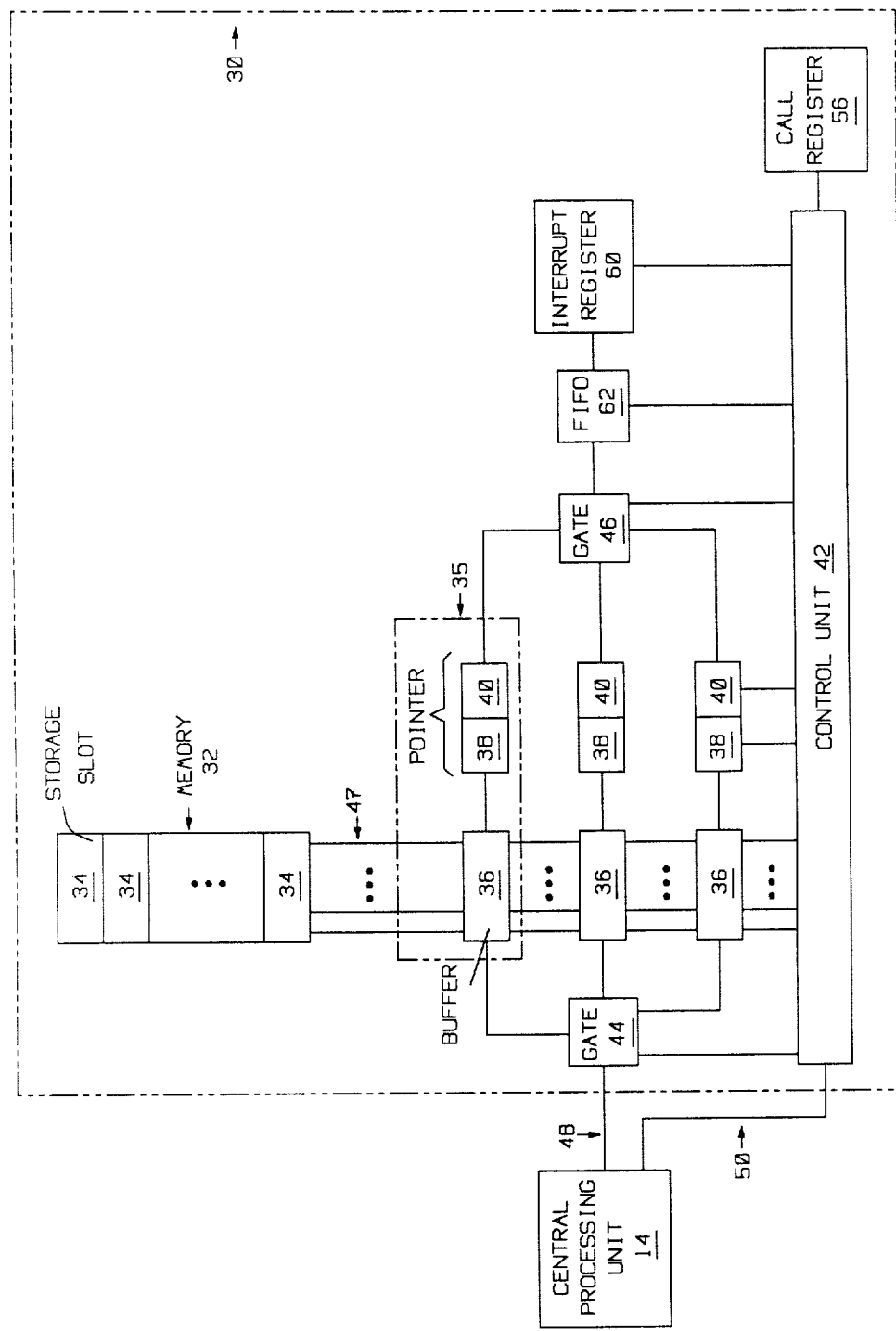
FIG. 2 is a block diagram of the preferred embodiment of the instruction memory system of the present invention.
Figure 2A:
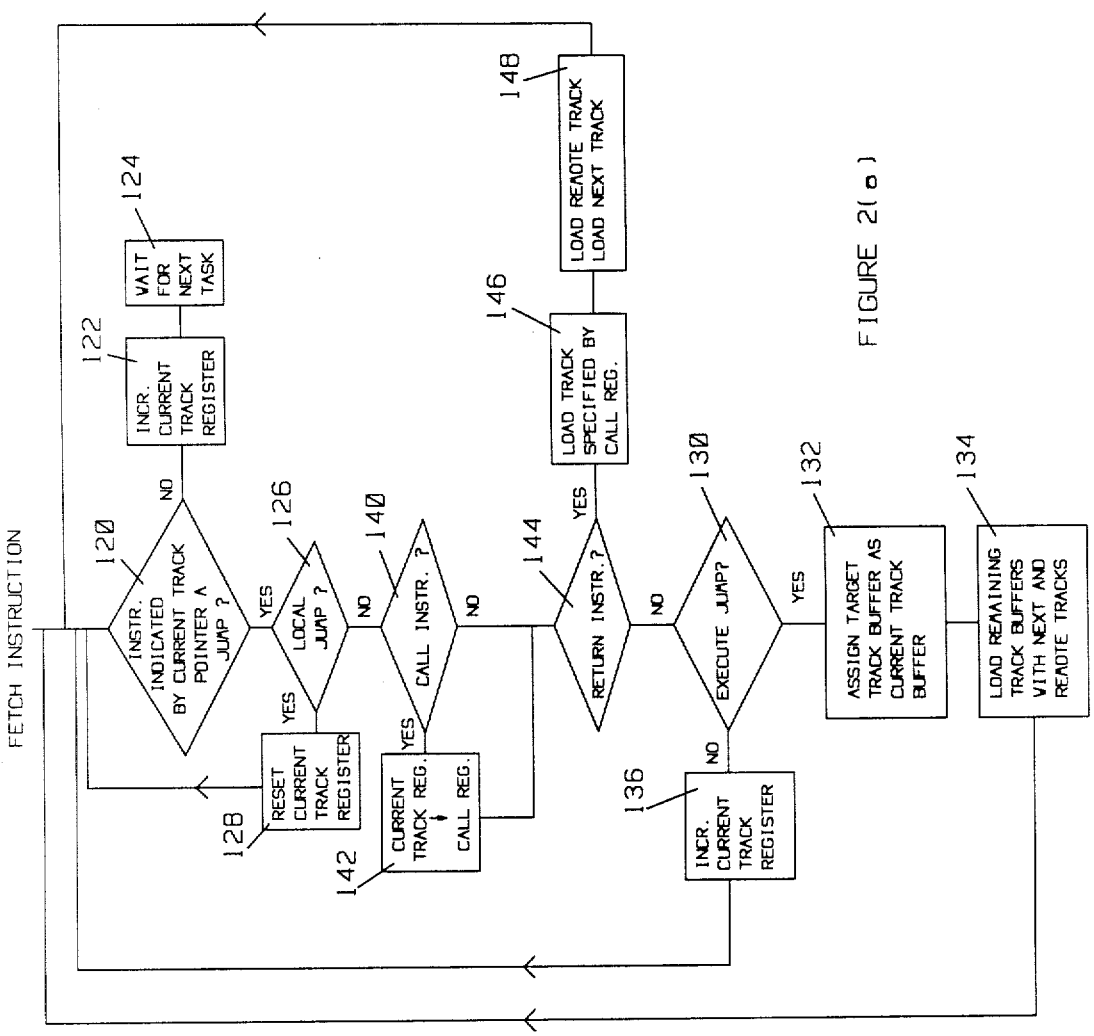
FIG. 2(a) is a flow chart of the instruction fetch cycle of the preferred embodiment of the present invention.

A block diagram of the preferred embodiment of an instruction memory system according to the present invention is shown in greater detail at 30 in FIG. 2. FIG. 2(a) is a flow chart of the instruction fetch cycle used in this embodiment. The main memory 32 is divided into a plurality of storage slots 34. Each storage slot 34 is used to store one track. Each storage slot 34 consists of 16 words of storage. An instruction stored in the main memory 32 may require one or two such words depending on the specific instruction in question. Hence, each storage slot 34 can store a track having between 8 and 16 instructions. If a track requires more storage than is available in one storage slot, the track can be broken into a series of smaller tracks linked by jump instructions.

In this embodiment, each track may have at most two jump instructions which have target instructions in other tracks. One of these jump instructions is the last instruction in the track; it is always present. The other of these instructions if present, is a conditional jump instruction or a jump instruction of the type used in a subroutine call or the like. The jump instruction which ends the track defines the next track to be executed unless a previous jump in the track has caused the program to branch to a different track, referred to as the remote track.

Hence, three addresses of importance are associated with each track. The first of these is the address of the first instruction of the track in question which is referred to as the track address. The second address is the address of the next track, and the third address is the address of the remote track if one is s pecified in the track. As will be described in more detail below, these three addresses are stored separately in part of the main memory 32 associated with the track in question.

In the preferred embodiment shown in FIG. 2, the buffer memory (shown at 16 in FIG. 1) consists of three track buffers 35. Each track buffer 35 contains a track storage buffer 36 for storing the track and the address of the remote track, a register 38 for storing the address of the track stored in the track storage buffer 36, and a register 40 which contains the location of the next instruction in the track storage buffer 36 which is to be executed, i.e., the offset of the instruction in question. Hence, the address of the next instruction consists of a binary word having the contents of register 38 as its most significant bits and the contents of register 40 as its least significant bits. The address of the next track is contained in the last instruction in the track, it is not separately stored, since it is always at a predetermined place in the track.

At any given time, only one of the track storage buffers 36 is active. This track storage buffer is referred to as the current track buffer, since it contains the instructions which are currently being executed either by the instruction memory system 30 of the present invention or the central processing unit 14. The track storage buffer which is the current track buffer is specified by a control unit 42 by signals to gate circuits 44 and 46. The next instruction to be executed from the current track buffer is copied from the track storage buffer through the gate circuit 44. If this instruction is to be delivered to the central processing unit 14, i.e., it is not a jump instruction, it is copied onto the bus 48 which connects the central processing unit 14 instruction memory 30 as shown at 120, 122, and 124 in FIG. 2(a). A separate group of signal lines 50 is employed for communicating all other data between the central processing unit 14 and the instruction memory system 30. These lines will be described in more detail below.

As each instruction is copied out of the current track buffer, the register 40 specifying the next instruction to be executed in the track storage buffer 36 which is assigned to be the current track buffer is incremented by an amount equal to the number of words in the last instruction which was just copied out of the current track buffer as shown at 122, and 136 in FIG. 2(a). The control unit 42 performs this function.

The remaining track storage buffers 36, i.e., those track storage buffers which are not the current track buffer, are used to store the two possible tracks which may be required if one of the jump instructions in the current track buffer is executed. The first of these track storage buffers is defined to be the next track buffer. It is used to store the track whose first instruction is the target instruction of the jump instruction which ends the track stored in the current track buffer. The second of these track storage buffers is defined to be the remote track buffer. It contains the track whose first instruction is the target instruction of a jump instruction contained within the track in the current track buffer, if such a jump instruction is present.

In addition to jump instructions having a target address in a track different from the track in which said jump instruction is stored, the present invention supports local jump instructions with target addresses in the same track. When the control unit 42 encounters a local jump instruction as shown at 126 in FIG. 2(a), it merely resets the register 40 in the current track buffer to indicate the target instruction specified in said jump instruction as shown at 128 in FIG. 2(a). Hereinafter, the term "jump instruction" will be reserved for jump instructions having a target address in a track different from that in which said jump instruction is stored.

When the control unit 42 encounters a jump instruction in the current track buffer which is to be executed as shown at 130 in FIG. 2(a), it compares the address of the target instruction of said jump instruction with the track address of each of the tracks stored in the remote track buffer and current track buffer. It then defines the track whose address matches the address of the target instruction in question as the new current track buffer as shown at 132 in FIG. 2(a) and sets the register 40 which specifies the offset of the first instruction to be executed in said track to zero. The control unit 42 then continues processing instructions from this new current track buffer starting with the first instruction of the current track buffer. Next the control unit 42 loads the remaining two track storage buffers with the remote track and next track specified in the track which is in the current track buffer as shown at 134 in FIG. 2(a). Each track is copied into the appropriate track storage buffer 36 over a wide bus 47 which connects the main memory 32 to each of the track buffers 35. The bus 47 allows an entire track 34 to be copied in a single memory cycle which may be interleaved with the delivery of instructions to the central processing unit 14 to prevent this process from delaying the delivery of instructions to the central processing unit 14.

As described above, the address of the remote track, if any, which are associated with each track are stored separately in said track at a predetermined location. This information is provided by the compiler used to generate the code stored in the present invention. Since these addresses are always at the same location in the track buffer, the present invention is not required to examine the entire track to locate the jump instructions. This significantly reduces the time needed to fetch the desired tracks. The control unit 42 needs only to examine the track addresses present at this location in the current track buffer to determine which tracks should be loaded into the remaining track storage buffers. When each track is loaded, the control unit 42 also loads the track address of said track into the register 38 associated with said track and sets register 40 to zero. These operations are interleaved with the delivery of instruction from the current track buffer and are completed in the time needed to deliver the first few instructions to the central processing unit 14. Hence, no delay in instruction processing is experienced unless a jump instruction is contained within the first one or two instructions of the track in the current track buffer and the target track of said jump instruction has not yet been loaded in one of the track buffers 35.

The preferred embodiment uses three track buffers 35 because this is the smallest number of track storage buffers which will allow uninterrupted delivery of instructions. If only one such track storage buffer were used, a delay would be introduced each time a jump instruction was encountered. Two track storage buffers would allow the delays encountered in executing the jump instructions at the end of each track to be effectively eliminated, but a delay would still be experienced each time a conditional jump instruction contained within the track was executed. Since, in general, it can not be determined whether the condition on which the jump depends is satisfied until the actual time of execution of the jump instruction, there is no way of predicting whether this jump instruction, or the one ending the track, will be used. Hence, three track buffers 35 are needed to guarantee that the next track to be used is ready for instruction delivery, i.e., one for the current track, one for the next track, and one specified in a jump instruction internal to the track.

Embodiments in which more than three track buffers 35 are used will be apparent to those skilled in the art. Such embodiments would allow tracks having more than one remote jump instruction in the track; hence, these embodiments could use larger tracks. For example, a memory system with 4 track buffers 35 would allow two remote jump instructions per track. Such embodiments would provide storage space in each track for the address of each target instruction contained within the track and for the address of the target instruction corresponding to the jump instruction which ends the track. One of the track buffers 35 would be the current track buffer at any given time. The remaining track buffers 35 would be used to store each track whose first instruction was the target instruction of one of the jump instructions in the track in the current track buffer. When the control unit 42 encountered a jump instruction in the current track buffer, it would compare the address of the target instruction with the addresses stored in the address storage registers 38 in each of the track buffers 35. The track buffers 35 having a matching address in its address storage register 38 would then become the current track buffer. The remaining track buffers 35 would then be filled with the tracks specified in the jump instructions in the new current track buffer.

In order for the present invention to execute conditional jumps, it must be able to ascertain the status of the condition on which said jump depends. This information is, in general, contained in the central processing unit 14. The central processing unit 14 typically evaluates an arithmetical or logical expression which is used to control the jump instruction in question. Hence a means for communicating the results of this evaluation to the apparatus of the present invention is needed. This is accomplished by assigning one or more signal lines 50 for signaling the status of a condition on which a jump depends. The central processing unit evaluates the expression and then sets these lines. These operations are controlled by the instructions delivered to the central processing unit by the memory system of the present invention. The conditional jump instruction which depends on this expression is located in the program stored in the present invention at an address following that of the instructions which cause the lines in question to be set. When said condition jump instruction, e.g., jump if control line greater than zero, is encountered by the control unit 42, said control unit examines the signal level on the signal line in question and executes the jump instruction based on said level. If the central processing unit 14 is a pipelined processor, it is possible for the conditional jump instruction in question to be executed by the present invention before the instruction which sets the state of the signal line in question is executed by the central processing unit 14. This will occur when the conditional jump instruction is the next instruction following the instruction which sets the state of the signal line. In this case, the signal line setting instruction will be in the first stage of the pipeline when the present invention encounters the jump instruction. To avoid this problem, when the central processing unit 14 is a pipelined processor and the jump instruction occurs immediately after these lines are set, the compiler used to assemble the program being executed into the instructions stored in the main memory 32 can insert one or more spacer instructions, commonly known as "no-ops", between the instruction that sets these condition lines and the jump instruction which depends upon them to guarantee that the proper signals are on these lines when the control unit 42 encounters the conditional jump instruction in question.

The instruction memory according to the present invention also supports instructions which facilitate subroutine calls and the servicing of interrupts. The manner in which these instructions operate can most easily be understood with reference to the analogous instructions in a conventional computer system.

Most programs executed by a computer contain operations which are repeated at several different points in the computer program. To save memory space, these operations are coded into subroutines which may be called from anywhere within the program. When a subroutine is called, the central processing unit stores the location of the instruction following the call instruction and then jumps to the beginning of the subroutine. When the subroutine is finished, it executes a return instruction which causes the program to continue executing instructions starting with the instruction following the call instruction.

In a conventional computer system, the central processing unit executes the call and return instructions. A typical conventional central processing unit includes a register, referred to as the program counter, which contains the address of the next instruction to be executed by the central processing unit. When the central processing unit encounters a call instruction, the value in the program counter is stored on a push down stack in the computer memory, and then the central processing unit executes a jump instruction whose target instruction is the first instruction of the subroutine. This jump is accomplished by loading the address of the first instruction of the subroutine into the program counter. A corresponding return instruction is present at the end of the subroutine. When the central processing unit encounters this return instruction, it causes the value of the program counter that was stored on the push down stack to be entered into the program counter. This results in the program resuming execution with the instruction after the call instruction which caused the jump to the subroutine.

The subroutine in question may call a second subroutine from within it. Such subroutines are referred to as nested. When the first subroutine calls the second subroutine, the address of the next instruction in the first subroutine after the call to the second subroutine is pushed down onto the stack above the program counter value specifying the next instruction in the main program which followed the call to the first subroutine. This leaves the stack with the return address in the first subroutine on top of the return address in the main program. When the second subroutine is finished, a return instruction will be executed which loads this address in the program counter and removes this address from the top of the stack. Control will thus be transferred to the first subroutine at the appropriate location. The stack will now have the address of the instruction following the call to the first subroutine in the main program as its top most entry. Hence, when the return instruction in the first subroutine is finally executed, control will return to the main program at the instruction after the call.

In the present invention, the registers 38 and 40 in the current track buffer perform the function performed by the program counter in a conventional central processing unit. These registers contain the address of the first instruction in the track currently being executed and the location of the next instruction to be executed relative to said first instruction. To perform a call to a subroutine, the values in these two registers, referred to jointly as the current track register hereinafter, must be stored so that the program execution can resume at the next instruction after the call when the return instruction in the subroutine is executed.

There are two possibilities for storing the value of the current track register. The value of the current track register may be stored in the instruction memory of the present invention, or it may be stored in the memory space which is under the direct control of the central processing unit 14, i.e., in one of the central processing unit registers or in the memory coupled to the central processing unit 14 which is used to store data. Each of these possibilities presents a problem. If the value of the current track register is stored in the instruction memory of the present invention, sufficient memory must be set aside to store as many values of the current track register as there are possible levels of subroutine nesting. This memory is not available for storing instructions when it is not being used to hold current track register values. Hence, incorporating it into the instruction memory results in a decrease in the storage capacity of this memory. On the other hand, if the current track register values are stored in the memory which is under the control of the central processing unit 14, the execution of a call or return instruction must be delayed by the time needed to transfer the current value of the current track register between the central processing unit memory and the instruction memory.

The present invention uses a combination of these two possibilities to minimize the problems that are separately inherent in each of these possibilities. A special register 56, referred to as the call register hereinafter, is used to store one value of the current track register. Hence a call to a subroutine at the first level of nesting does not incur a delay resulting from a need to transfer the current track register value to the central processing unit 14. If more than one value must be stored, the present invention moves the last value stored in the call register 56 to the central processing unit 14. This minimizes the amount of storage space needed in the instruction memory for storing current track register values while introducing delays only into those calls which involve nested subroutines. Such nested calls are less frequent than non-nested calls.

The control unit 42 executes both call and return instructions. When a call instruction is encountered as shown at 140 in FIG. 2(a), the control unit 42 stores the value of the current track register in the call register 56 and then executes a jump to the address specified in the call instruction as shown at 142 in FIG. 2(a). This jump is treated the same as the ordinary jump instructions described above. The control unit 42 determines which of the track storage buffers 35 contains the track which begins with instruction which is the target of the jump instruction, i.e., the track which begins with the first instruction of the subroutine in question. It then assigns that track storage buffer to be the current track buffer and loads the remaining two track storage buffers with the next track and remote track specified in the newly loaded current track buffer. If the subroutine in question is a nested subroutine, the compiler used to assemble the code which is stored in the main memory 32 will have inserted a save call register instruction before the call instruction in question. This instruction will be delivered by the control unit 42 to the central processing unit. The central processing unit then executes the save call register instruction by signaling the control unit 42 on the signal lines 50 connecting the central processing unit 14 to the instruction memory. The signal lines 50 include lines for specifying instructions from the central processing unit 14 which are to be executed by the control unit 42 and data lines for transferring data between the instruction memory and the central processing unit 14. When the control unit 42 detects this signal, it places the contents of the call register 56 on the appropriate signal lines. The central processing unit 14 then reads the value in question and stores said value in its memory.

When the control unit 42 encounters a return instruction as shown at 144 in FIG. 2(a), it loads the registers 38 and 40 in the current track buffer with the value in the call register 56 as shown at 146 in FIG. 2(a) and then it loads the current track buffer with the track specified in register 38 as shown at 148 in FIG. 2(a). However, in contrast to its execution of jump instructions described above, the control unit 42 does not reset register 40 to indicate the first instruction of this track. Hence, execution commences with the instruction whose address was stored as a result of the call instruction, not the first instruction of the track in question. Once the current track buffer is properly loaded, the control unit 42 then loads the other track storage buffers 35 with the tracks specified as the next track and remote track in the newly loaded current track buffer. If the subroutine in which the return instruction was located was a nested subroutine, the compiler will have inserted a restore call register instruction after the call instruction which caused the jump to the subroutine. This will be the first instruction executed after the return instruction. This instruction will be delivered by the present invention to the central processing unit 14, which will place a new address to be stored in the call register 56 on the signal lines 50. The central processing unit will then signal the control unit 42 using one of the signal lines 50. Upon receiving this signal, the control unit 42 will cause this new address to be stored in the call register 56. Hence, when the next return instruction is executed by the control unit 42, the proper value will have been stored in the call register 56.

Interrupts are serviced in a manner analogous to a subroutine call. For the purposes of the present discussion, "interrupt" includes any interruption of central processing unit processing which is not initiated by a jump or subroutine call in the program stored in the main memory 32 being executed by the control unit 42. Such interruptions may be the result of a signal on one or more external signal lines connected to the central processing unit or as a result of hardware contained in the central processing unit itself, such as trap hardware which is invoked when an error condition is detected in the central processing unit, e.g. a division by 0.

In a conventional data processing system, an interrupt is used to interrupt the program currently being executed so that a second program having higher priority may be executed. At the completion of the interrupt, control is returned to the first program. An interrupt is typically asserted by providing signals on one or more of a predetermined group of signal lines. The lines in question specify the location of the second program in the data processing system. An interrupt is essentially a jump to a subroutine which is initiated by a condition which is external to the program being executed by the central processing unit at the time of the interrupt.

Upon receipt of an interrupt in a conventional data processing system which is not pipelined, the central processing unit completes the instruction it is currently executing and then stores the value of the program counter and of other registers whose contents must be saved on the stack. It then executes a jump to the location specified on the interrupt lines. At the completion of the interrupt, this value is placed back in the program counter. This results in the program resuming with the next instruction after the one that was being executed when the interrupt was received.

In a pipelined central processing unit, several instructions will be in the pipeline when the interrupt is received. The central processing unit must complete the execution of the instruction currently in the execution stage, store the location of the next instruction after this instruction, and then clear the pipeline so that it can be properly loaded with the interrupt routine instructions. It should be noted that when the interrupt is received, the program counter contains the address of the next instruction which is to enter the pipeline, not the address of the next instruction to enter the execution stage of the central processing unit. The address of the next instruction to enter the execution stage of the central processing unit 14 is the value of the program counter at the time this instruction entered the pipeline, not the value of the program counter at the time of the interrupt.

Figures 2B, 2C:
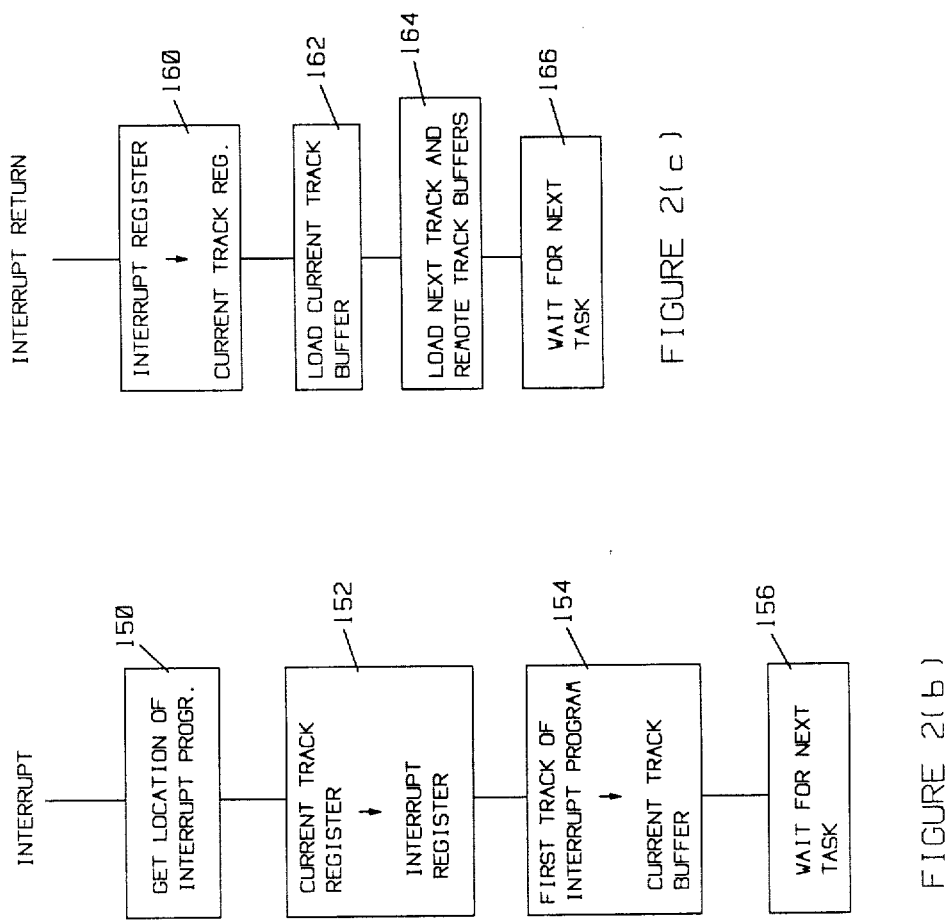
FIG. 2(b) is a flow chart of the operations carried out by the preferred embodiment of the present invention in processing an interrupt.
FIG. 2(c) is a flow chart of the operations carried out by the preferred embodiment of the present invention in processing return from interrupt instruction.

The instruction memory system of the present invention executes the jumps needed to process interrupts. FIGS. 2(b) and 2(c) are flow charts of the operations carried out by control unit 42 in processing interrupts and the return therefrom. When the central processing unit detects an interrupt, it signals the control unit 42 over one or more of the signal lines 50. The specific lines and or signals specify the location of the interrupt processing program in the main memory 32. Upon receipt of this signal as shown at 150 in FIG. 2(b), the control unit 42 stores the value, of the current track register in an interrupt register 60 as shown at 152 in FIG. 2(b). As mentioned above, this value corresponds to the instruction which would have entered the execution stage of the central processing unit 14 had the interrupt not been received. The method by which this value is determined will be discussed in detail below. After storing this current track register value, the current track buffer is loaded with the track whose first instruction is the first instruction of the interrupt service routine as shown at 154 and 156 in FIG. 2(b), and the remaining two track storage buffers 35 are then loaded with the next track and remote track specified in the newly loaded current track buffer. The central processing unit is responsible for removing the remaining unexecuted instructions from the pipeline. The interrupt routine ends with a return from interrupt instruction which is executed by the control unit 42. This instruction causes the current track register value stored in the interrupt register 60 to be placed in the current track register and the current track buffer to be loaded with track specified by said current track register as shown at 160,162, 164, and 166 in FIG. 2(c).

In the preferred embodiment, interrupts may not be nested; hence, there is no need to provide storage for more than one current track register value. However, it will be apparent to those skilled in the art that embodiments which allow nested interrupts may be constructed using two additional instructions. These two additional instructions are used to save the current track register value stored in the interrupt register 60 by transferring it to the central processing unit 14 and to place a previously stored current track register value back into the interrupt register 60.

A nested interrupt occurs when the program has already been interrupted to process a first interrupt and a second interrupt having higher priority is received. This situation is analogous to that described for nested subroutines above. Since storage for only one current track register value is available in the instruction memory, the previous value must be transferred to the central processing unit 14 for storage and returned to the interrupt register 60 when the higher priority interrupt has been serviced. The first instruction is used to store the value in the interrupt register 60 in the central processing unit 14 by placing said value on the signal lines 50 and delivering an instruction to the central processing unit 14 specifying that this value is to be stored. This instruction should be the first instruction executed by an interrupt routine, since the time of arrival of a higher priority interrupt can not be predicted. Hence, it is important that the current track register value in question be stored before it can be overwritten by another current track register value when a higher priority interrupt is received. Each interrupt service routine must also include a second instruction which is executed at the end of said routine. This instruction will cause the central processing unit 14 to transfer the previous current track register value stored by the central processing unit to control unit 42, which in turn will place this value in the interrupt register 60 where it will be available for use by the return from interrupt instruction.

As noted above, the current track register value which is to be stored in the interrupt register 60 is the value of the current track register which corresponds to the next instruction that would have entered the execution stage of the central processing unit 14 had the interrupt not been received, not the value of the current track register corresponding to the next instruction to be sent to the central processing unit 14. Pipelined processors hold a number of instructions at various stages of execution. When an interrupt is received, the central processing unit 14 finishes the instruction which is in the execution stage of the pipeline and then flushes the remaining instructions in the pipeline. The pipeline is then filled with instructions from the interrupt service routine. If the pipeline holds 3 instructions in the stages prior to the execution stage, the current track register value which must be stored is that value which was present 3 instructions before the interrupt was received, not the current value of the current track register. The present invention employs a fixed length first-in first-out (FIFO) buffer 62 to store the current track register values corresponding to the previous instructions. The length of this buffer is one less than the number of preexecution stage instructions held by the central processing unit 14. Hence, if the central processing unit 14 holds 3 instructions in the stages prior to the execution stage, a FIFO buffer having space to store 2 current track register values is used. In the preferred embodiment, the FIFO buffer 62 consists of a shift register. Each time an instruction is delivered to the control unit 42, the corresponding current track register value is shifted into the FIFO buffer 62 which results in the oldest value in said FIFO buffer being shifted into the interrupt register 60. The gate circuit 46 determines which of the register pairs, 38 and 40, is shifted into the FIFO buffer 62.

The present invention is intended for use in multiprocessor computer systems in which the central processing unit 14 is but one of a plurality of concurrently operating central processing units, each with its own instruction memory according to the present invention. In such systems, a given central processing unit must often wait for a result from one of the other central processing units before it can proceed with the portion of the overall program under its control. To avoid lost processing time when one of these wait conditions is encountered, the present invention provides a means for rapidly switching programs so that this idle time may be used to work on a second program which may be totally different from the program which is currently blocked. This type of program switching will hereinafter be referred to as context switching.

The operations needed to switch contexts between a first program which is currently active and a second program which is in the inactive state are very similar to those needed to service an interrupt. A context switch is initiated by the central processing unit 14 by signals on a switch context request line which is part of bus 50. The value of the current track register corresponding to the next instruction in the first program which is to be executed must be stored so that the first program can be restarted at the appropriate place when it returns to active status. After this current track register value is stored, a jump is executed having as its target instruction the next instruction in the second program which is to be executed. The target instruction will be the instruction specified by a current track register value which was stored the last time contexts were switched. Hence, a change of contexts requires that one current track register value be stored, a second current track register be retrieved and loaded into the call register 56, and, finally, a jump be executed to the instruction specified by the call register 56.

In principle, the various current track register values may be stored and retrieved by passing the values to the central processing unit 14 for storage and retrieval from the memory under its control. However, this is a time consuming process which would partially negate the improvements achieved in providing context switching. Instead, the present invention provides storage for the necessary current track register values. A separate call register 56 is maintained for each context. At any given time, only one of these call registers is active. When contexts are switched, the current track register value is stored in the active call register 56 as it would prior to a subroutine call. This preserves the starting location in the context which is about to become inactive. This call register then becomes inactive and the call register 56 corresponding to the new context becomes the active call register. This call register will still have the current track register value corresponding to the next instruction to be executed in the new context stored in it, this value having been placed there when contexts were last switched. Hence, a simple return instruction, i.e., jump to instruction specified in the newly activated call register 56, will restart the new context.

The central processing unit must also keep track of the current context, since it is often responsible for storing current track register values in the data memory under its control. As pointed out above, when nested subroutines are employed in a program, each current track register value corresponding to the instruction to be executed on return from a subroutine is stored on a stack in the central processing unit memory used for storing data. In the multiple context embodiment of the present invention, the central processing unit 14 maintains one such stack for each context. Two of the signal lines 50 connecting the central processing unit 14 to the present invention are used to keep track of the current context. These data lines are under the control of the central processing unit 14.

In addition to the two contexts which allow the central processing unit 14 to alternate between two programs stored in the instruction memory, a third context, referred to as the kernel context is supported in the present invention. The kernel context is used to execute interrupts. This third context allows interrupts to be serviced without the need to save the current contents of the call register 56. Without this third context, an interrupt service routine which employed subroutines would have to save the current contents of the call register 56 at the beginning of the interrupt to assure that the contents in question were not destroyed by a subroutine call in the interrupt service routine. At the end of the interrupt routine, the original contents would have to be restored to the call register 56. This storage and restoration process would require that the current track register values in question be passed back and forth between the instruction memory and the central processing unit 14. This is a time consuming process which is to be avoided, if possible.

When an interrupt is detected by the central processing unit 14, it changes the state of the signal lines 50 which specify the current context so as to specify the kernel context. The service routine that processes the interrupt then resets the state of these lines to specify the original context when it is finished. Two signal lines are used to specify the current context. Setting the context to and from the kernel context is accomplished by setting the state of one of the these lines. The other of these lines specifies which of the non-kernel contexts is active. Since this line is not changed when the kernel context is set, the present invention will automatically return to the context it was in prior to the interrupt when the line specifying the kernel context is reset to its non-kernel context value.

To commence processing, the instruction memory of the present invention must be initialized and the appropriate track data, i.e., the instructions which constitute the program to be executed, must be transferred to the main memory 32 by the central processing unit 14. In the preferred embodiment, the apparatus of the present invention is initialized by a reset pulse of a sufficient length that is detected on one of the signal lines 50. This reset pulse sets the various registers to predetermined states and initiates a bootstrap loading procedure which is stored in the present invention and executed by the control unit 42 to input track data from the central processing unit 14. It should be noted that the central processing unit 14 cannot merely start by transferring the instructions which constitute the program to be stored in the instruction memory of the present invention, since this would require the delivery of instructions from the instruction memory to the central processing unit 14, and no such instructions are contained in the instruction memory at the time in question.

Embodiments in which the main memory 32 is a read-only memory, in which the programs to be executed are permanently stored, will be apparent to those skilled in the art. Such fixed program embodiments of the present invention would be useful in dedicated special purpose data processing systems in which the program executed by the system is never changed. These embodiments would not require the bootstrap loading procedure mentioned above.

The preferred embodiment of the present invention is fabricated on a single VLSI chip. The present limitations imposed by VLSI fabrication processes limit the capacity of a single such chip to about 2000 instructions. Although this capacity may be sufficient for certain limited processing systems, it is too small, in general, to be useful in large multiprocessor systems. Hence, a means for constructing a large memory from a plurality of chips is needed.

The simplest means for constructing a large memory system according to the present invention would be to provide two types of chips, a "register chip" and a "RAM" chip. The register chip would contain the track buffers, the various registers used for storing addresses, and the control unit 42. One or more RAM chips would be used to construct the main memory 32. A bus analogous to the bus 47 shown in FIG. 2 would be used to connect the RAM chips to the register chip.

The main problem with this type of architecture is that the RAM chips need to be interfaced with the control chip over a wide bus. As discussed above, each track is transferred to the appropriate track storage buffer in a single memory cycle. In the preferred embodiment, each track consists of 16 6-bit data words. Hence, the bus for transferring a track between one of the RAM chips and the register chip would need to have 96 lines for transferring the tracks in question in addition to the lines needed to specify the address of the track to be transferred and the various control lines needed to run the bus in question. The limitations imposed by integrated circuit packaging make such a bus impractical.

The present invention avoids this bus limitation by providing a means for combining a plurality of memory chips according to the present invention into a large memory. Such a larger memory system is shown in FIG. 3 at 79. It is constructed from a plurality of memory chips 80. Each memory chip 80 contains all of the components described above with reference to FIG. 2 including a main memory 82 used for storing the tracks under its control, track storage buffers 84 for storing tracks from which instruction may be transferred, a call register 86, interrupt registers 88, and a control unit 92. Each of the track storage buffers has a register 87 associated with it which is used as the current track register when said track storage buffer is the current track storage buffer. Each of the registers has a one bit flag 90 associated with it. This flag is used to specify whether the register in question is currently active. In a memory system constructed from N memory chips 80 there will be 3N track storage buffers. At any one time, only 3 of the possible 3N track storage buffers will be active. These three may be in the same memory chip 80 or in different memory chips. These will correspond to the current track buffer, the next track buffer, and the remote track buffer, as described above. These registers will be marked by bit 90 being set to the active state. The remaining track storage buffers will have bit 90 set to the inactive state. The various memory chips 80 communicate with each other over a bus 94. Instructions are delivered to the central processing unit 14 over a second bus 95.

In addition to the bits 90 used to specify if a specific register in a given chip is active, each memory chip 80 includes a one bit flag 96 which specifies whether the memory chip itself is active. This bit is used to define the memory chip 80 which currently is delivering instructions to the central processing unit 14. This is the memory chip which contains the active current track buffer.

In the preferred embodiment, a 16-bit address is used to specify the location of a given instruction in the large memory system constructed from a plurality of memory chips 80. This address has 3 components, a chip address, a track address, and an offset. The chip address constitutes the most significant 5 bits of the 16-bit address. It specifies which of the plurality of memory chips contains the instruction in question. Each memory chip includes a register which holds its chip identity and which is loaded when the system is reset. This register constitutes the most significant 5 bits of the track address in the current track register. The track address consists of the next 7 most significant of the 16-bit address stored in the current track buffer. These 7 bits specify the location at which the track containing the instruction in question is located in the main memory 82. Finally, the offset consists of the last or least significant 4 bits of the 16-bit address stored in the current track buffer. It specifies the location of the particular instruction relative to the beginning of the track in which the instruction in question is stored.

If the currently active memory chip 80 detects that the high-order bits of a target instruction specified in a jump instruction do not match its chip address, the address of the target instruction together with an "activate request", will be broadcast on the bus 94 by the currently active memory chip to the idle memory chips 80. One of these idle memory chips will contain this address, i.e., its chip address will match the 5 high order bits of the address of the target instruction in question. This memory chip 80 will latch the target instruction address into one of its inactive track storage buffers 87 and set the bit 90 associated with said track storage buffer 87 to the active state. Hence, when the jump instruction in question is executed, the currently active memory chip 80 will transfer control to this newly addressed memory chip which will set its chip active bit 96 to indicate that it is now the active chip and define the track storage buffer 87 in question as the current track buffer. The previously active chip 80 will have reset its chip active bit 96 as well as reset the bit 90 associated with the track storage buffer which was the current track buffer in said chip, prior to the execution of the jump instruction in question.

Similarly, when the currently active memory chip 80 encounters an instruction or receives a command that requires access to a register, such as the call register 86, and its copy of said register is inactive, the appropriate register code is transmitted to all idle memory chips 80. The memory chip 80 having the active copy of the register in question will then respond and become the active memory chip.

It will be apparent to those skilled in the art that an alternative memory system may be constructed in which the active chip contains the active copy of each register e.g. registers 86 and 88 used for calls and interrupts. Such a memory system would require that the contents of each of these registers be transferred to the new active memory chip 80 whenever a change in the identity of the active memory chip occurred. Such transfers would significantly degrade the performance of the memory system, since such register-register transfers would occur frequently. The instruction memory of the present invention avoids this degradation in performance. However, this approach requires that register activation and inactivation must be carefully controlled to ensure that no inconsistencies arise. It must appear to the central processing unit 14 that only one register of each type exists. This may be accomplished by the following rules.

First, when the system is initially powered up and reset, one memory chip 80 will have all of its registers flagged as active. The remaining memory chips will have their copies of the registers flagged as inactive.

Second, when a return address is saved by the memory system in the call register or interrupt register, the affected register will be flagged as active. This register will be the call or interrupt register in the active memory chip 80. In the case of the call register, only the register for the currently active context will be affected. A signal will be broadcast to all of the idle memory chips on the bus 94 indicating that their copy of the register in question should be flagged as inactive.

Third, when a jump instruction is executed using the call register or interrupt register as its source, the currently active register will be selected as the source. If the active chip does not contain the active copy of the required register, a register code must be broadcast to the rest of the memory chips. The memory chip 80 which contains the active copy of said register will then take control by setting its flag bit 96 to indicate the active state for said memory chip 80. The previously active memory chip 80 will reset its flag bit 96 to indicate the inactive state when it receives an acknowledgment from the memory chip containing the active copy of said register.

Fourth, when the contents of the active call register or interrupt register are to be transferred to the central processing unit for storage, the contents of the currently active register will be output to the central processing unit on the data bus 50 without affecting the state of the bit 90 associated with said register. This allows non-destructive read requests for monitoring and debugging.

Finally, when the central processing unit wishes to transfer a value back to the call or interrupt registers, only the active memory chip 80 will write the value on the data bus to the specified register. All other memory chips will be instructed to set the bit 90 associated with their copy of the register in question to indicate the inactive state for said register.

The above operations are directed either to the memory chip 80 which is active or to the memory chip 80 which contains the active copy of a given register. There is a third class of requests which refer to a specified physical memory chip 80. For example, if the processor wishes to load a track data into a specified address in the memory system or examine the contents of one or more of the registers located on said memory chip 80. These instructions are specified by signals from the central processing unit on control lines included in bus 95. These instructions include those which specify which memory chip 80 is active, instructions for loading a track at a specified address in the presently active memory chip 80, and instructions for reading and writing the various registers in the currently active memory chip 80.

It will be apparent to those skilled in the art that multi-chip embodiments of the present invention which require even fewer external connections may be constructed by using the bus 95 for communication between the various chips. In such an embodiment, one of the lines in the bus 95 would be used to signal the central processing unit 14 that the data on said bus was intended for another memory chip 80 and not for the central processing unit 14. The performance of such an embodiment would be somewhat inferior to that of the preferred embodiment described above, since no instructions could be delivered to the central processing unit 14 when the bus 95 was being used to communicate between the memory chips. The bus 95 would be needed for communication between chips when an off-chip jump instruction is detected in the current track buffer, i.e., to signal that the track in question be fetched into an appropriate track storage buffer 87 in the memory chip in which said track is located, and when an off-chip jump is executed to transfer control to a new memory chip. Since off-chip jumps occur much less frequently than the delivery of instructions to the central processing unit 14, the degradation in performance resulting from off-chip jumps is relatively small. The degradation in performance from off-chip fetching of tracks in anticipation of a possible jump can be eliminated by not fetching such tracks until a jump instruction is actually executed. This would result in a delay in instruction delivery whenever an off-chip jump occurred. However, since off-chip jumps are less frequent than jumps on the same chip, this strategy actually minimizes the delays in instruction delivery in such a shared bus system.

Various modifications in the present invention as described above will be apparent to those skilled in the art without departing from the present invention as claimed.

What is claimed is:

1. A memory system for delivering instructions to a processing unit wherein said instructions include conditional and non-conditional jump instructions, a conditional jump instruction being executed only if a condition specified in said instruction is true, and each said jump instruction including information specifying the address of an instruction in said memory system which is to be executed next if said jump instruction is executed, said memory system comprising:
   means for coupling said memory system to said processing unit;
   memory means for storing a plurality of tracks, each said track comprising a sequential series of instructions, each said track beginning with an instruction whose address is specified in a jump instruction and ending with a non-conditional jump instruction;
   buffer means for storing at least one of said tracks, said buffer means being coupled to said processing unit coupling means and said memory means; said buffer means including buffer indicating means for indicating an instruction stored in said buffer means; and
   control means comprising means for examining the instruction indicated by said buffer indicating means and for delivering the instruction so indicated to said processing unit if said instruction is not a jump instruction and for causing said buffer indicating means to indicate the next sequential instruction stored in said buffer means if said indicated instruction is not a jump instruction which is to be executed and, if said indicated instruction is a jump instruction to be executed, for causing the track whose first instruction is identified in said jump instruction to be stored in said buffer means if said track is not already so stored and for causing the first instruction of said track to be indicated by said buffer indicating means.

2. The memory system of claim 1 wherein said buffer means comprises:
   a plurality of track buffer means, each said track buffer means comprising track storage buffer means for storing a track, pointing means for indicating the location of an instruction in said track storage buffer means, and track address storage means for storing the address in said memory system of the first instruction
   current track buffer assignment means for assigning one of said track buffer means as the current track buffer, for causing the pointer means in said current track buffer to indicate the first instruction in the track storage buffer in said current track buffer, and for causing each track having a first instruction specified by a jump instruction in said current track buffer to be stored in one of said track buffer means, the pointing means in said track buffer to be set to indicate the first instruction of said track;
   and wherein said control means comprises:

means for examining the instruction indicated by the pointing means included in the current track buffer;

means for determining if said instruction is a jump instruction; and means for delivering the instruction indicated by said pointing means to said processing unit if said instruction is not a jump instruction and for causing said pointing means to indicate the next sequential instruction stored in said current track buffer if said indicated instruction is not a jump instruction to be executed and, if said indicated instruction is a jump instruction to be executed, for causing said current track buffer assignment means to assign the track buffer means whose address storing means contains an address which matches the address in said jump instruction to be identified as the current track buffer.

3. The memory system of claim 2 wherein said jump instructions include local jump instructions which specify an instruction in the track in which said local jump instructions is stored and wherein said control means further comprises means for causing the pointer means in said current track buffer to indicate the instruction specified in said local jump instruction when said control means examines a local jump instruction which is to be executed.

4. The memory system of claim 2 wherein said control means further comprises means, responsive to predetermined signals on said processing unit coupling means, for causing instructions present on said processing unit coupling means to be stored in said memory means.

5. The memory system of claim 2 wherein said control means further comprises:

call means for storing the address in said memory system of the instruction in the current track buffer which is indicated by the pointing means in said current track buffer, said call means being responsive to predetermined jump instruction;

return means for causing the track containing said address to be stored in a track buffer means, for causing said current track buffer assignment means to assign said track buffer means as the current track buffer, and for causing the pointing means in said current track buffer to indicate the instruction stored at said address, said return means being responsive to a predetermined jump instruction.

6. The memory system of claim 5 wherein said control means further comprises:

means for transferring the address stored in said call means to said processing unit, said tranferring means being responsive to predetermined signals on said processing unit coupling means, and means for storing an address specified by signals on said processing unit coupling means in said call means, said storing means being responsive to predetermined signals on said processing unit coupling means.

7. The memory system of claim 5 wherein said control means further comprises:

interrupt means for storing the address in said memory system of the next instruction to be executed by said processing unit;

means, responsive to predetermined signals on said processing unit coupling means, for causing said interrupt means to store said address, for causing a track specified by said signals to be stored in a track buffer means, and for causing said current track buffer assignment means to assign said track buffer means as the current track buffer; and means for causing the track containing the address stored in said interrupt means to be stored in a track buffer means, for causing said current track buffer assignment means to assign said track buffer means as the current track buffer, and for causing the pointing means in said current track buffer to indicate the instruction stored at said address.

8. The memory system of claim 7 said control means further comprises:

means for transferring the address stored in said interrupt means to said procesing unit, said transferring means being resonsive to predetermined signals on said processing unit coupling means, and means for storing an address specified by signals on said processing unit coupling means in said interrupt means, said storing means being responsive to predetermined signals on said processing unit coupling means.

9. The memory system of claim 5 wherein said call means includes a plurality of register means, each said register means providing means for storing the address of the first instruction of a track and for indicating an instruction in said track, and a register specifying means for specifying the instruction specified by the contents of one of said registers as the next instruction to be examined by said control means and wherein said control means further comprises means for changing the register specified by said register specifying means, said changing means being responsive to predetermined signals on said processing unit coupling means; and means for causing the track whose address is stored in said register means to be loaded into a track buffer storage means, for causing said current track buffer assignment means to assign said track buffer storage means as the current back buffer, and for causing the pointing means in said current track buffer to indicate the instruction indicated by said register means.

10. A memory system for delivering instructions to a processing unit wherein said instructions include conditional and non-conditional jump instructions, a conditional jump instruction being executed only if a condition specified in said instruction is true, and each said jump instruction including information specifying the address of an instruction in said memory system which is to be executed next if said jump instruction is executed, said memory system comprising a plurality of memory chips, each said memory chip comprising:

means for coupling each said memory chip to said processing unit;

chip coupling means for coupling said memory chip to the other memory chips in said memory system;

memory means for storing a plurality of tracks, each said track comprising a sequential series of instructions, said track beginning with an instruction specified in a jump instruction and ending with a non-conditional jump instruction;

buffer means for storing at least one of said tracks, said buffer means being coupled to said processing unit coupling means and said memory means; said buffer means including buffer indicating means for indicating an instruction stored in said buffer means;

chip enabling means for specifying one of two states, active or inactive for said memory chip; and means, responsive to said memory chip being in the active state, comprising means for examining the instruction indicated by said buffer indicating means, for delivering the instruction so indicated to said processing unit if said instruction is not a jump instruction and for causing said buffer indicating means to indicate the next sequential instruction stored in said buffer means if said indicated instruction is not a jump instruction which is to be executed and, if said indicated instruction is a jump instruction to be executed, for causing the track whose first instruction is identified in said jump instruction to be stored in the said buffer means of the memory chip containing said track if said track is not already so stored, for causing the first instruction of said track to be indicated by the said buffer indicating means in the memory chip in which said track is stored, and for causing the chip enabling means to specify the active state for said memory chip and the inactive state for all other memory chips in said memory system.

11. The memory system of claim 10 wherein each said buffer means further comprises:
a plurality of track buffer means, each said track buffer means comprising track storage buffer means for storing a track, pointing means for indicating the location of an instruction in said track storage buffer means, track address storage means for storing the address in said memory system of the first instruction of the track stored in said track storing means, and track enabling means for specifying one of two states, active or inactive, for said pointing means;
wherein said memory system further comprises current track buffer assignment means for assigning one of said track buffer means as the current track buffer and, when a track storage buffer is so assigned, for setting the track enabling means of said track buffer means to the active state, for setting the track enabling means of all other pointing means to specify the inactive state, for setting the chip enabling means of the memory chip containing the current track buffer to specify the active state for said memory chip and the inactive state for all other memory chips in said memory system, for causing each track beginning with an instruction specified in a jump instruction in said current track buffer to be stored in a track buffer means in the memory chip in which said track is stored, for setting the track enabling means of said track to specify the active state for said track, and for setting the pointing means in said track buffer means to indicate the first instruction in said track storage buffer;
and wherein said control means further comprises:
means for examining the instruction indicated by the pointing means included in the current track buffer;
means for determining if said instruction is a jump instruction; and
means for delivering the instruction indicated by said pointing means to said processing unit if said instruction is not a jump instruction and for causing said pointing means to indicate the next sequential instruction stored in said current track buffer if said indicated instruction is not a jump instruction to be executed; and,
if said indicated instruction is a jump instruction to be executed, for causing the track buffer means whose address storing means contains an address which matches the address in said jump instruction to be assigned as the current track buffer by said current track buffer assignment means.

12. The memory system of claim 11 wherein said jump instructions include local jump instructions which specify an instruction in the track in which said local jump instructions is stored and wherein said control means further comprises means for causing the pointer means in said current track buffer to indicate the instruction specified in said local jump instruction when said control means examines a local jump instruction which is to be executed.

13. The memory system of claim 11 wherein said control means further comprises means, responsive to predetermined signals on said processing unit coupling means, for causing instructions present on said processing unit coupling means to be stored in said memory means.

14. The memory system of claim 11 wherein each said memory chip further comprising:
call means for storing the address in said memory system of the instruction in the current track buffer which is indicated by the pointing means in said current track buffer, said call means being responsive to a predetermined jump instruction;
call enabling means for specifying one of two states, active or inactive, for said call means, said call enabling means being set to specify the active state when said call means stores an address of an instruction in said memory chip and said call means being set to specify the inactive state when the call means in another memory chip stores an address; and
return means for causing the track containing an address stored in the call means in the active state to be stored in a track buffer means in the memory chip in which said track is stored and for causing said track buffer means to be assigned as the current track buffer by said current track buffer assignment means, for causing the pointing means in said current track buffer to indicate the instruction whose address is stored in said address storing means, said return means being responsive to a predetermined jump instruction.

15. The memory system of claim 14 wherein the control means in each said memory chip further comprises:
means for transferring the address stored in the call means having a call enabling means in the active state to said processing unit, said transferring means being responsive to predetermined signals on said processing unit coupling means, and
means for storing an address specified by signals on said processing unit coupling means in the call means of the currently active memory chip and for causing the call enabling means of said memory chip to specify the active state for the call means in said memory chip and the inactive sate for the call enabling means in all other memory chips.

16. The memory system of claim 14 wherein the control means in each said memory chip further comprises:
interrupt means for storing the address in said memory system of the next instruction to be executed by said processing unit;
interrupt enabling means for specifying one of two states, active or inactive, for said interrupt means, said interrupt enabling means being set to specify the active state when said interrupt means stores an address of an instruction in said memory chip and said interrupt means being set to specify the inactive state when the interrupt means in another memory chip stores an address;

means responsive to predetermined signals on said processing unit coupling means for causing the said interrupt means in the memory chip which is in the active state to store said address, for causing the interrupt enabling means of said interrupt means to specify the active state for said interrupt means and the inactive state for all other interrupt means in the memory system, for causing a track specified by said signals to be stored in a track buffer means in the memory chip containing said track, for causing said current track buffer assignment means to assign said track buffer means as the current track buffer, and for causing the track enabling means in said current track buffer means to specify that the pointer in said current track buffer is active; and means for causing the track containing the address stored in the said interrupt means in the active state to be stored in a track buffer means in the memory chip containing said track, for causing said current track buffer assignment means to assign said track buffer means as the current track buffer, and for causing the pointing means in said current track buffer to indicate the instruction stored at said address.

17. The memory system of claim 16 wherein each said control means further comprises:
   means for transferring the address stored in the said interrupt means which is in the active state to said processing unit, said transferring means being responsive to predetermined signals on said processing unit coupling means, and
   means for storing an address specified by signals on said processing unit coupling means in the said interrupt means which is in the active state.

18. The memory system of claim 11 wherein each call means includes a plurality of register means, each said register means providing means for storing the address of the first instruction of a track and for indicating an instruction in said track, and a register specifying means for specifying the contents of one of said registers as being the next instruction to be examined by said control means and wherein said control means further comprises
   means for changing the register specified by said register specifying means, said changing means being responsive to predetermined signals on said processing unit coupling means; and
   means for causing the track whose address is stored in a said register means to be loaded into a track buffer storage means of the memory chip in which said track is stored and for causing said current track buffer assignment means to assign said track buffer means as the current track buffer when said register is first specified by said register specifying means.

* * * * *

UNITED STATES PATENT AND TRADEMARK OFFICE
CERTIFICATE OF CORRECTION

PATENT NO. : 4,755,935

DATED : July 5, 1988

INVENTOR(S) : Alan L. Davis, et al.

It is certified that error appears in the above-identified patent and that said Letters Patent is hereby corrected as shown below:

```
Column  6, line  2, after "to" insert --be--.
Column  6, line 59, after "been" insert --delivered to the central
    processing unit 14'. In--.
Column  7, line 15, after "this" insert --instruction--.
Column  7, line 30, after "not," insert --the control--.
Column 10, line 36, after "jump" insert --instruction--.
Column 11, line 11, after "jump" insert --instruction--.
Column 11, line 14, after "by the" insert --jump--.
Column 11, line 21, after "jump" insert --instruction--.
Column 11, line 27, after "before the" insert --jump--.
Column 18, line 11, after "of" delete "the".
Column 22, line 57, after "instruction" insert -- of the track stored in
        said track storing means; and --.
Column 24, line 68, after "and" insert -- control --.
Column 26, line 59, delete "sate" and insert -- state --.
```

Signed and Sealed this

Thirty-first Day of January, 1989

Attest:

DONALD J. QUIGG

*Attesting Officer*      Commissioner of Patents and Trademarks